United States Patent [19]

Klusman et al.

[11] Patent Number: 5,080,499
[45] Date of Patent: Jan. 14, 1992

[54] HIGH TEMPERATURE SQUEEZE FILM DAMPER

[75] Inventors: Steven A. Klusman, Indianapolis; Richard J. Trippett; James E. Crook, both of Carmel, all of Ind.

[73] Assignee: General Motors Corporation, Detroit, Mich.

[21] Appl. No.: 498,131

[22] Filed: Mar. 23, 1990

[51] Int. Cl.⁵ ............................ F16C 27/00; F16C 3/00
[52] U.S. Cl. .......................................... 384/99; 74/574; 464/180
[58] Field of Search ................... 384/99, 535, 581; 464/180; 74/574; 277/212 FB

[56] References Cited

U.S. PATENT DOCUMENTS

| | | | |
|---|---|---|---|
| 2,631,901 | 3/1953 | Holben et al. | 384/99 |
| 3,552,804 | 1/1971 | Bracken, Jr. | 384/99 |
| 3,836,215 | 9/1974 | Dopkin et al. | 384/99 |
| 4,161,237 | 7/1979 | Uchida et al. | 188/1 |
| 4,214,796 | 7/1980 | Monzel et al. | 384/202 |
| 4,226,139 | 10/1980 | Zilahi-Szabo | 74/574 |
| 4,254,847 | 3/1981 | Kamman et al. | 188/1 |
| 4,647,227 | 3/1987 | Clebant | 384/99 |
| 4,705,410 | 11/1987 | Broock | 384/99 |
| 4,781,077 | 11/1988 | El-Sahfei | 74/573 |

Primary Examiner—Daniel P. Stodola
Assistant Examiner—William G. Battista, Jr.
Attorney, Agent, or Firm—Saul Schwartz

[57] ABSTRACT

A squeeze film damper for the high temperature environments includes a fixed journal on a support, a floating journal on a rotating shaft, a damping ring in an annular chamber between the fixed and floating journals, and a pair of metal bellows straddling annular exposed channels defined at a pair of clearance gaps between the fixed and floating journals. The metal bellows are welded to the fixed and floating journals on opposite sides of the exposed channels and filled with high temperature resistant viscous fluid. The damping fluid flows to the damping chamber through the annular channels and the clearance gap between the fixed and floating journals.

5 Claims, 1 Drawing Sheet

HIGH TEMPERATURE SQUEEZE FILM DAMPER

This invention was made in the course of work under a contract or subcontract of the United States Department of Defense.

FIELD OF THE INVENTION

This invention relates to squeeze film vibration dampers for rotating shafts.

BACKGROUND OF THE INVENTION

Typical squeeze film vibration dampers for rotating shafts include fixed and floating journals connected, respectively, to a support and to the shaft. Facing cylindrical surfaces on the fixed and floating journals define therebetween an annular squeeze film chamber. Commonly, lubricating oil is ported to the squeeze film chamber and retained therein by elastomeric seals between the fixed and floating journals. The elasticity of the seals accommodates relative movement between the fixed and floating journals and leakage around the seals is replenished by continuous oil circulation. When unbalance induces radial displacement of the rotating shaft relative to the support, the squeeze film chamber is locally constricted. Energy is dissipated and the vibrations damped as the constriction orbits around the axis of rotation of the shaft at the speed of rotation of the shaft against a resisting force induced by the oil in the squeeze film chamber. Where the squeeze film damper is intended to operate between two rotating shafts rather than between a shaft and a support, both journals float. In one such damper, a fixed volume of oil is retained in a squeeze film chamber by O-rings between the two floating journals. None of these prior squeeze film dampers are suitable for applications in hot environments where temperatures may exceed the working temperature ranges of lubricating oil and elastomeric seals. A squeeze film damper according to this invention is particularly suited for high temperature applications.

SUMMARY OF THE INVENTION

This invention is a new and improved squeeze film damper for application in high temperature environments. The squeeze film damper according to this invention includes a squeeze film chamber defined between fixed and floating journals and a metal bellows between the fixed and floating journals which confines a high temperature resistant viscous fluid without impeding relative movement between the journals. In a preferred, double acting embodiment of the squeeze film damper according to this invention, the floating journal has a stepped annular groove therein. A shallow step portion of the groove envelops the fixed journal and a deep step portion of the groove cooperates with the fixed journal in defining an annular chamber for a damping ring. Clearance gaps between the fixed and floating journals define flow paths to the annular chamber containing the damping ring. Metal bellows straddle exposed channels defined at the clearance gaps between the fixed and floating journals and are welded to the fixed and floating journals to define sealed flexible reservoirs confining a volume of high temperature resistant viscous damping fluid. The high temperature resistant viscous damping fluid is preferably selected from a class of compounds known as polyphenyl ethers.

DESCRIPTION OF A PREFERRED EMBODIMENT

Figure 1:
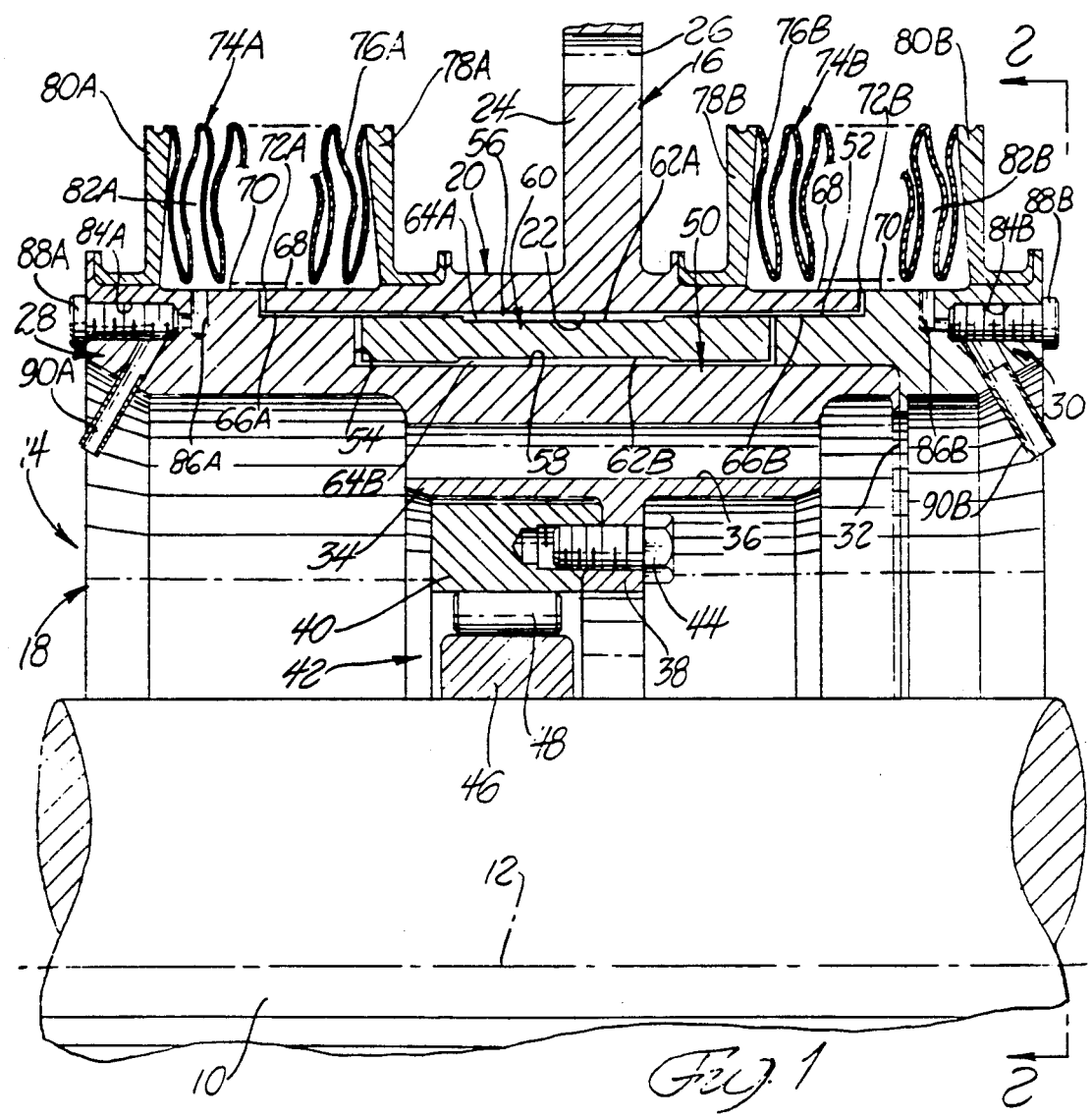
FIG. 1 is a fragmentary sectional view of a squeeze film damper according to this invention taken at the longitudinal center plane of the damper.
Figure 2:
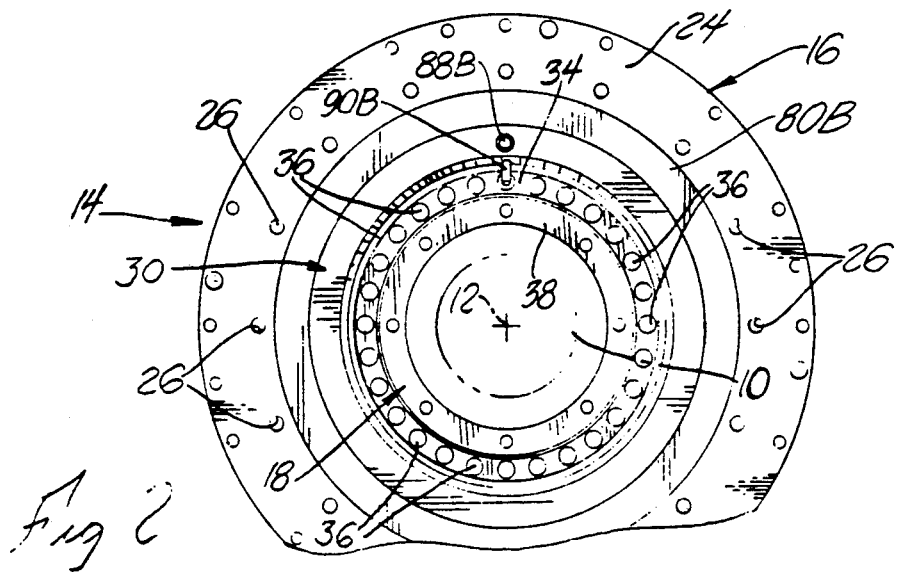
FIG. 2 is a reduced size view taken generally along the plane indicated by lines 2—2 in FIG. 1.

With reference to both drawing Figures, a shaft 10 is mounted on a support, not shown, for rotation about an axis 12. A two-stage squeeze film damper 14 according to this invention is disposed between the shaft 10 and the support and includes a fixed journal 16 and a floating journal 18. The fixed journal includes a body 20 having an inside cylindrical wall 22 centered on the axis 12. An integral annular flange 24 extends out from the body 20 in a plane perpendicular to the axis 12. A plurality of bolt holes 26 in the flange 24 define locations whereat the fixed journal 16 is rigidly attached to the aforesaid support.

The floating journal 18 is a two-piece weldment including a tubular element 28 and an annular cap 30 welded to the tubular element at an interface 32. The tubular element 28 has an internal annular web 34 through which extend a plurality of ventilation passages 36 for transmission of air or coolant gas across the plane of the damper 14. The tubular element 28 further includes an annular flange 38 integral with the web 34.

An outer race 40 of a bearing 42 is bolted to the flange 38 by a plurality of bolts 44 through a corresponding plurality of bolt holes in the flange 38. An inner race 46 of the bearing is fixed to the shaft 10 for rotation and for lateral displacement therewith. A plurality of rollers 48 of the bearing 42 transfer lateral displacement of the shaft 10 and inner race 46 to the outer race 40 and the floating journal 18.

The tubular element 28 and cap 30 cooperate in defining on the floating journal 18 a stepped annular groove 50 facing the fixed journal 16. The stepped groove has a wide, shallow groove portion 52 which envelops the cylindrical body 20 of the fixed journal and a more narrow, deep groove portion 54 facing the cylindrical wall 22 of the fixed journal. The deep groove portion 54 cooperates with the cylindrical wall 22 of the fixed journal in defining an annular chamber 56 bounded by the cylindrical wall 22, the sides of the deep groove portion, and a bottom 58 of the deep groove portion 54. The bottom 58 defines an outside cylindrical wall of the floating journal facing the inside cylindrical wall 22 of the fixed journal.

A cylindrical damping ring 60 is disposed in the chamber 56. The damping ring has a pair of cylindrical walls 62A-B facing and cooperating, respectively, with the cylindrical wall 22 on the fixed journal 16 and with the bottom 58 of the deep groove portion 54 on the floating journal in defining a pair of damping annuli 64A-B of the two-stage squeeze film damper 14.

A pair of clearance gaps 66A-B are defined between the fixed and floating journals 16,18. The clearance gaps 66A-B intersect an outer cylindrical surface 68 of the fixed journal 16 and a contiguous outer cylindrical surface 70 of the floating journal 18 and define thereat a pair of annular exposed channels 72A-B on opposite sides of the flange 24. The clearance gaps 66A-B define fluid flow paths from the exposed channels 72A-B to the annular chamber 56 and to the damping annuli 64A-B defined therein.

The squeeze film damper 14 further includes a pair of metal bellows 74A-B. The bellows have a plurality of accordion pleats or annular corrugations 76A-B, a pair of cylindrical inboard end 78A-B, and a pair of cylindrical outboard ends 80A-B. The bellows 74A-B straddle the exposed channels 72A-B, respectively, and define therearound a pair of flexible reservoirs 82A-B. The ends 78A-B, 80A-B are welded to respective ones of the fixed and floating journals to seal the reservoirs 82A-B. Because of the flexibility of the annular corrugations 76A-B, the bellows 74A-B do not impede displacement of the floating journal 18 relative to the fixed journal 16 perpendicular to the axis 12.

A pair of threaded fill ports 84A-B are formed in opposite ends of the floating journal 18 and communicate with respective ones of the sealed flexible reservoirs 82A-B through a pair of drilled passages 86A-B. The fill ports 84A-B are closed by respective ones of a pair of threaded plugs 88A-B. High temperature resistant viscous damping fluid is introduced through a pair of ducts 90A-B and through the fill ports 84A-B. The fluid migrates to the annular chamber 56 and the damping annuli 64A-B through the exposed channels 72A-B and the clearance gaps 66A-B. The reservoirs, the clearance gaps, the annular chamber 56 and the damping annuli are filled to a pressure of about 50 psi. The fluid is captured in the reservoirs by plugs 88A-B.

The high temperature resistant viscous fluid is preferably selected from a group of compounds known as polyphenyl ethers which are not corrosive to the fixed and floating journals, the damping ring, and the bellows at temperatures up to about 750 degrees Farenheit for periods of operation exceeding about 6000 hours. Suitable fluids are OS-138 (TM) and OS-124 (TM) available from Monsanto Industrial Chemicals Co., 800 N. Lindbergh Blvd., St. Louis, Mo. 63166.

In operation, radial vibratory displacement of the shaft 10 induces localized constriction of the damping annuli 64A-B. The localized constrictions whirl or orbit around the axis 12 at the speed of the shaft against resisting forces induced in the high temperature viscous fluid whereby the shaft vibrations damped.

The metal bellows 74A-B are important features of this invention because their flexibility does not impede radial vibratory displacement of the floating journal 18 as a unit with the shaft 10 relative to the fixed journal 16. Further, the metal bellows are not susceptible to high temperature deterioration characteristic of elastomeric seals and are readily welded to the fixed and floating journals to leak-proof the reservoirs. The damper 14 is fully self-contained and does not require provision for replenishing the volume of viscous damping fluid in the reservoirs 82A-B during operation of the damper.

The embodiments of the invention in which an exclusive property or privilege is claimed are defined as follows:

1. In a squeeze film damper including
  a fixed journal attached to a support and defining an inside cylindrical wall,
  a floating journal defining an outside cylindrical wall,
  means mounting said floating journal on a shaft with said outside cylindrical wall thereon facing said inside cylindrical wall on said fixed journal and with a predetermined clearance gap between said fixed and said floating journals,
  means defining a first outer surface on said fixed journal having a first edge adjacent said clearance gap,
  means defining a second outer surface on said floating journal having a second edge adjacent said clearance gap and cooperating with said first edge in defining therebetween an exposed channel, and
  means defining an annular squeeze film damping chamber between said outside cylindrical wall on said floating journal and said inside cylindrical wall on said fixed journal communicating with said predetermined clearance gap,
the combination comprising:
  a metal bellows straddling said exposed channel,
  means sealingly connecting a first end of said metal bellows to said first outer surface on said fixed journal,
  means sealingly connecting a second end of said metal bellows to said second outer surface on said floating journal so that a sealed flexible reservoir is defined around said exposed channel, and
  a high temperature resistant viscous damping fluid in said sealed flexible reservoir filling said reservoir and said damping chamber through said exposed channel and through said predetermined clearance gap between said fixed and said floating journals.

2. The squeeze film damper recited in claim 1 and further including:
  means on one of said fixed journal and said floating journal defining a sealable fill port through which said viscous damping fluid is introduced into and maintained in said sealed flexible reservoir.

3. The squeeze film damper recited in claim 2 wherein said first outer surface on said fixed journal and said second outer surface on said floating journal are contiguous cylindrical surfaces, and
  said metal bellows straddling said exposed channel is a cylinder including a plurality of annular corrugations.

4. The squeeze film damper recited in claim 3 wherein each of said first and said second ends of said metal bellows is a cylinder welded to corresponding ones of said first and said second outer surfaces.

5. The squeeze film damper recited in claim 4 wherein said means defining said annular squeeze film damping chamber between said outside and said inside cylindrical walls includes a damping ring having a pair of cylindrical walls facing respective ones of said outside and said inside cylindrical walls.

* * * * *